United States Patent
Schlingmann

(10) Patent No.: US 11,261,818 B2
(45) Date of Patent: Mar. 1, 2022

(54) SYSTEM AND METHOD FOR CONTROLLING NVH IN AN ENGINE CONTAINING CVVD TECHNOLOGY

(71) Applicants: Hyundai Motor Company, Seoul (KR); KIA Motors Corporation, Seoul (KR)

(72) Inventor: Dean Schlingmann, San Dimas, CA (US)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 48 days.

(21) Appl. No.: 16/688,401

(22) Filed: Nov. 19, 2019

(65) Prior Publication Data

US 2021/0148301 A1    May 20, 2021

(51) Int. Cl.
*F02D 41/34* (2006.01)
*F02P 5/15* (2006.01)
*F02D 41/00* (2006.01)

(52) U.S. Cl.
CPC .......... *F02D 41/345* (2013.01); *F02P 5/1502* (2013.01); *F02D 2041/001* (2013.01)

(58) Field of Classification Search
CPC . F02D 41/345; F02D 2041/001; F02P 5/1502
See application file for complete search history.

(56) References Cited

U.S. PATENT DOCUMENTS

| | | | | |
|---|---|---|---|---|
| 4,054,109 A * | 10/1977 | Herrin | ..................... | F01L 1/245 123/90.16 |
| 5,537,961 A * | 7/1996 | Shigeru | ............... | F01L 1/34406 123/90.15 |
| 6,360,531 B1 * | 3/2002 | Wiemero | ............... | F02P 5/1506 60/284 |
| 6,820,597 B1 * | 11/2004 | Cullen | ..................... | F02D 17/02 123/516 |
| 7,647,159 B2 * | 1/2010 | Fuwa | ..................... | F02D 41/006 701/103 |
| 7,930,087 B2 * | 4/2011 | Gibson | ............... | F02D 41/0005 701/103 |

(Continued)

FOREIGN PATENT DOCUMENTS

WO    WO 2007/054430 A1    5/2007

*Primary Examiner* — Phutthiwat Wongwian
*Assistant Examiner* — Susan E Scharpf
(74) *Attorney, Agent, or Firm* — Lempia Summerfield Katz LLC

(57) ABSTRACT

A vehicle control system for a powertrain including an internal combustion engine having an intake valve and an exhaust valve in a vehicle includes an electronic control unit (ECU) operable to control a continuously variable valve duration (CVVD) of the intake and exhaust valves in the engine, a communicator operable to receive an input data from at least one input system, and a storage device having predetermined calibration value. The ECU of the vehicle control system is configured to reference the predetermined calibration values based on a received input data, determines to adjust the CVVD of the intake and exhaust valves, and send a signal to the engine for changing an overlap area of the CVVD. The vehicle control system operates a process for controlling the CVVD of the engine as a method.

16 Claims, 8 Drawing Sheets

(56) References Cited

U.S. PATENT DOCUMENTS

| | | | |
|---|---|---|---|
| 8,145,410 B2* | 3/2012 | Berger | F16H 57/0006 |
| | | | 701/111 |
| 8,813,704 B2 | 8/2014 | Kim et al. | |
| 2007/0209619 A1* | 9/2007 | Leone | F02D 41/042 |
| | | | 123/90.12 |
| 2008/0262695 A1* | 10/2008 | Gibson | F02D 41/307 |
| | | | 701/102 |
| 2008/0276904 A1* | 11/2008 | Surnilla | F02D 41/0082 |
| | | | 123/406.45 |
| 2009/0255495 A1* | 10/2009 | Schnell | F01L 1/245 |
| | | | 123/90.15 |
| 2009/0276142 A1* | 11/2009 | Leone | F02D 41/0042 |
| | | | 701/103 |
| 2013/0080036 A1* | 3/2013 | Yamauchi | F02D 41/065 |
| | | | 701/112 |
| 2014/0283784 A1* | 9/2014 | Takahashi | F02D 41/3011 |
| | | | 123/350 |
| 2015/0114342 A1* | 4/2015 | Iwai | F02D 21/08 |
| | | | 123/305 |
| 2016/0115884 A1* | 4/2016 | VanDerWege | F02P 9/002 |
| | | | 123/481 |
| 2017/0342920 A1* | 11/2017 | Pirjaberi | B60W 20/15 |
| 2017/0342921 A1* | 11/2017 | Pirjaberi | F02D 41/0087 |
| 2017/0342922 A1* | 11/2017 | Pirjaberi | F02D 41/307 |
| 2018/0001885 A1* | 1/2018 | Leone | B60W 20/20 |
| 2018/0230919 A1* | 8/2018 | Nagashima | F02D 41/0002 |
| 2018/0266285 A1* | 9/2018 | Hanshaw | F01L 1/3442 |
| 2018/0334998 A1* | 11/2018 | Inoue | F02D 41/0052 |
| 2019/0093525 A1* | 3/2019 | Nakhle | F01L 13/0005 |

* cited by examiner

SYSTEM AND METHOD FOR CONTROLLING NVH IN AN ENGINE CONTAINING CVVD TECHNOLOGY

FIELD

The present disclosure relates to a system and method for controlling an intake valve and an exhaust valve in an internal combustion engine.

BACKGROUND

The statements in this section merely provide background information related to the present disclosure and may not constitute prior art.

An internal combustion engine generates power by burning fuel in a combustion chamber with air drawn into the chamber. The internal combustion engine is provided with a variable valve mechanism. The variable valve mechanism in the internal combustion engine includes intake valves operated by a camshaft for intaking the air and exhaust valves operated by another camshaft for exhausting combustion gas. In addition, the variable valve mechanism is capable of variably controlling each valves' opening timing and closing timing, and also a valve lift amount of the intake or exhaust valves.

In the internal combustion engine, generally, the operation of the intake valves and the exhaust valves depends on a rotation speed of the engine. Accordingly, it has been developed that a continuous variable valve timing (CVVT) system enables different valve timing operation depending on the engine speed and a continuous variable valve lift (CVVL) system can change valve lift according to the engine speed. However, we have discovered that the CVVT and CVVL systems are complicated, and also, the engine with the CVVT and CVVL systems has substantial variations at an idle state or a driving state. The variations in the combustion may be due to various factors including differences in fueling, charge preparation, charge distribution, and exhaust residuals between cylinders. The variations in the combustion lead to variations in cylinder pressure as well as cylinder torque output. Accordingly, the pressure and torque variations is transmitted to the engine mounting system leading to vibration transmission and related NVH (noise, vibration, and harshness) issues.

The above information disclosed in this Background section is only for enhancement of understanding of the background of the present disclosure, and therefore it may contain information that does not from the prior art that is already known to a person of ordinary skill in the art.

SUMMARY

The present disclosure relates to a vehicle control system and method for a powertrain including an internal combustion engine having an intake valve and an exhaust valve in a vehicle.

According to one aspect of the present disclosure, the vehicle control system includes an electronic control unit (ECU) operable to control a continuously variable valve duration (CVVD) of the intake and exhaust valves in the engine, a communicator operable to receive an input data from at least one input systems, and a storage device having predetermined calibration values associating the input data to desired noise, vibration and harshness (NVH) profiles for the powertrain. The electronic control unit is configured to reference the predetermined calibration values based on a received input data, determines to adjust the CVVD of the intake and exhaust valves, and send a signal to the engine for changing an overlap area (an opening/closing duration of the general valve) of the CVVD to set the desired NVH profile of the powertrain.

The electronic control unit (ECU) is configured to increase the overlap area of the CVVD by extending an opening/closing duration of each of the intake and exhaust valves. Also, the electronic control unit (ECU) is configured to decrease the overlap area of the CVVD by reducing an opening/closing duration of each of the intake and exhaust valves.

The at least one input system includes a driver demand such as an accelerator pedal position or a pedal rate, or an environmental input such as a road slope, a temperature, or a barometer pressure. The at least one input system further include a mode switch for selecting one of different modes such as a normal mode, an economic mode, and a sport mode of the vehicle.

The increased or decreased overlap area (opening/closing duration) of the CVVD of the intake and exhaust valves results in an enhanced NVH (noise, vibration, and harshness) of the engine.

According to another aspect of the present disclosure, a method for controlling a continuously variable valve duration (CVVD) of an intake valve and an exhaust valve in a powertrain including an engine includes the steps of initiating a vehicle control system by starting the engine, receiving an input data from at least one input system by a communicator of the vehicle control system, referencing a predetermined calibration value based on the received input data in an electronic control unit (ECU) of the vehicle control system, and sending a signal to the engine for changing an overlap area of the CVVD to set desired noise, vibration and harshness (NVH) profile of the powertrain.

The method further includes the step of determining, by the ECU, whether to adjust the CVVD of the intake and exhaust valves.

The method includes the step of increasing the overlap area of the CVVD by extending an opening/closing duration of each of the intake and exhaust valves. The method includes the step of decreasing the overlap area of the CVVD by reducing an opening/closing duration of each of the intake and exhaust valves.

In the method, the predetermined calibration values associate the input data to the desired NVH profiles for the powertrain.

Further areas of applicability will become apparent from the description provided herein. Everyone should understand that the description and specific examples presented herein are for the purpose of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
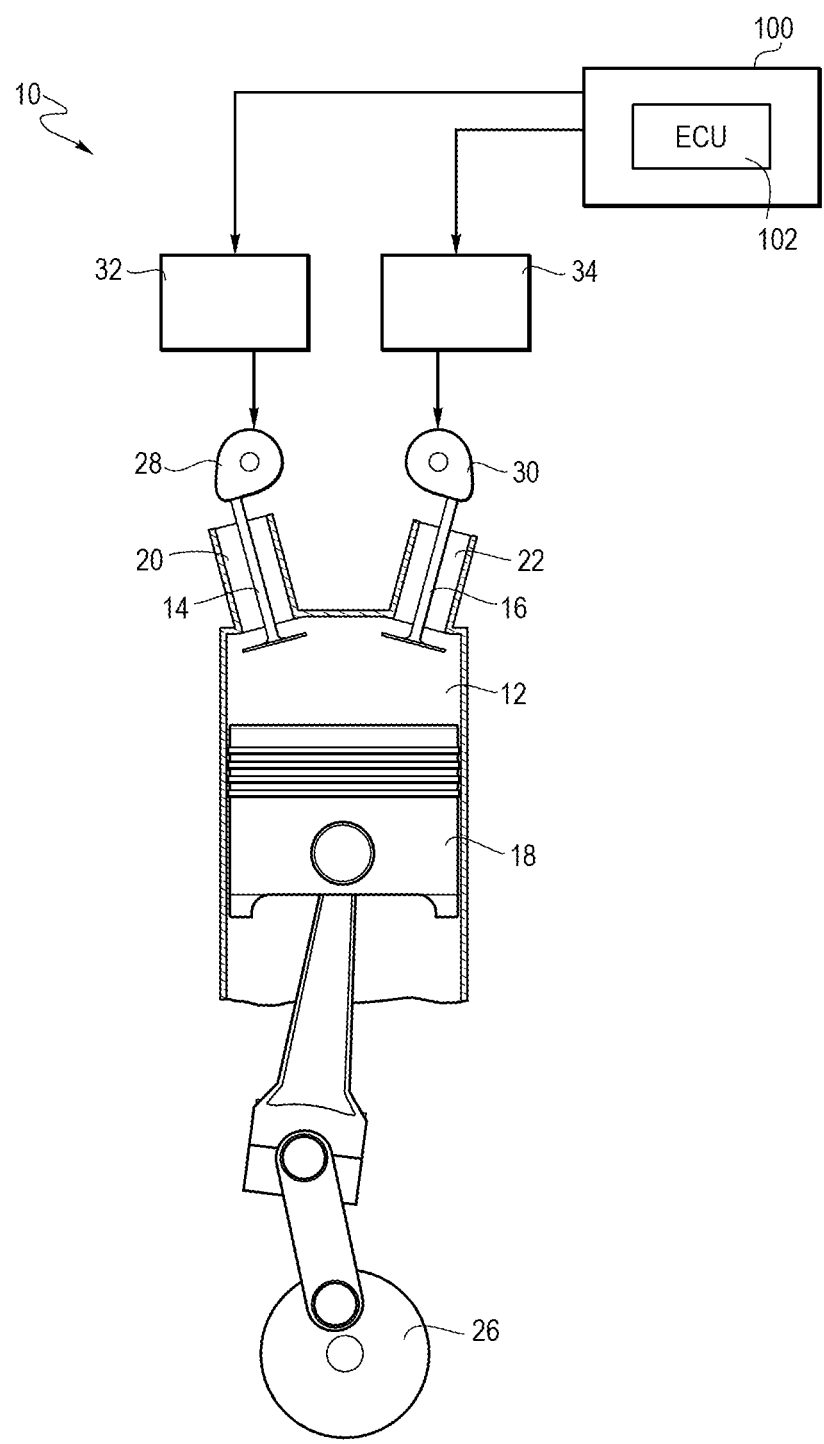
FIG. 1 is a schematic structural view illustrating an internal combustion engine having an intake valve and exhaust valve in accordance with a form of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure, its application, or uses. It should be understood that throughout the drawings, corresponding reference numerals indicate like or corresponding parts and features.

FIG. 1 illustrates a schematic structure of an internal combustion engine 10 in a vehicle. The internal combustion engine 10 includes cylinders and combustion chambers (only one is shown in FIG. 1). Each combustion chamber 12 is defined in one of the cylinders. The internal combustion engine 10 further includes an intake valve 14, an exhaust valve 16, and a piston 18. In addition, the engine 10 includes an intake passage 20 for flowing air drawn from outside into the combustion chamber 12, and an exhaust passage 22 for discharging air-fuel mixture after the combustion. In the combustion chamber 12, the air-fuel mixture consisting of intake air and injected fuel is ignited and burned. The combustion causes the piston 18 to reciprocate, causing a crankshaft 26 to rotate.

In the internal combustion engine 10, for example, the intake valve 14 is selectively opened and closed according to the rotation of an intake camshaft 28 to which the rotation of the crankshaft 26 is transmitted, and the exhaust valve 16 is selectively opened and closed according to the rotation of an exhaust camshaft 30 to which the rotation of the crankshaft 26 is transmitted. In accordance with other forms of the present disclosure, the internal combustion engine 10 may be operated with only one camshaft instead of two camshafts. Furthermore, the intake passage 20 and the combustion chamber 12 are selectively connected or disconnected by opening or closing the intake valve 14, and the combustion chamber 12 and the exhaust passage 22 are selectively connected or disconnected by opening or closing the exhaust valve 16.

As shown in FIG. 1, the intake camshaft 28 is provided with an intake continuous variable valve duration (CVVD) device 32 for controlling opening/closing duration of the intake valve 14 of the engine 10 according to a signal from a vehicle control system 100 having an electronic control unit (ECU) 102, and the exhaust camshaft 30 is provided with an exhaust continuous variable valve duration (CVVD) device 34 for controlling opening/closing duration of the exhaust valve 16 of the engine 10 according to a signal from the vehicle control system 100 having the ECU 102. Accordingly, the ECU 102 controls the intake CVVD device 32 and the exhaust CVVD device 34 based on the data related to a running state of the vehicle. The data are detected by a plurality of sensors including a vehicle speed sensor for measuring a vehicle speed, an engine speed sensor for measuring an engine speed from a change in phase of the crankshaft 26 or camshafts 28 and 30, an oil temperature sensor for measuring temperature of oil, an air flow sensor for measuring air amount flowing into the intake passage 20, and an accelerator pedal position sensor for measuring a degree at which a driver pushes an accelerator pedal.

Figure 2:
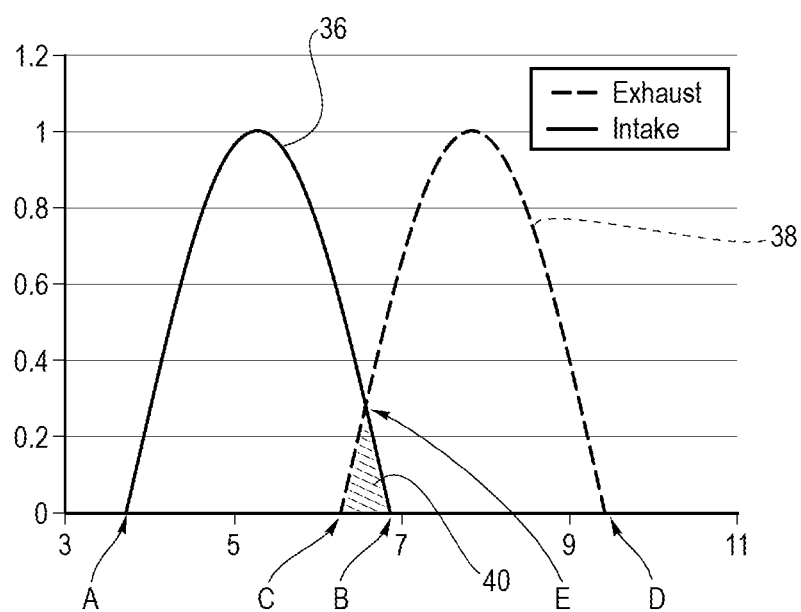
FIG. 2 is a graph showing a continuously variable valve duration (CVVD) of the intake and exhaust valves of FIG. 1.

FIG. 2 shows an example of the valve profile graph illustrating the intake and exhaust valve opening/closing duration by the operation of the intake and exhaust CVVD devices 32 and 34. In FIG. 2, an intake opening/closing duration curve 36 of the intake valve 14 and an exhaust opening/closing duration curve 38 of the exhaust valve 16 in the internal combustion engine 10 are shown. As shown in the graph of FIG. 2, the intake valve 14 opens at point A and closes at point B. The exhaust valve 16 opens at point C and closes at point D. At upper dead point E that is situated in the range of a load alteration, the intake valve 14 and the exhaust valve 16 are opened and closed so that a certain valve overlap duration between the intake valve 14 and the exhaust valve 16 is observed as shown in the graph and defined as an overlap area 40 such as the opening/closing duration of the valves.

In a traditional engine, a camshaft design and implementation relies on a solid camshaft design which sets valve duration permanently, based on cam lobe profiles. Until recently, there were limitations to operate the engine with the overlap so that only relying on variable timing or variable lift. In some cases, however, as shown in FIGS. 1 and 2, in the internal combustion engine 10 having the continuous variable valve duration (CVVD) devices 32 and 34, the valve duration may be adjusted via various cam timing devices to deliver specific performance requirements.

In addition, due to previous inability to adjust valve duration in the traditional engine, there are limitations to reduce NVH (noise, vibration, and harshness) related performance characteristics on a powertrain including the engine 10. According to the present disclosure, however, the ECU 102 in the vehicle control system 100 controls a process which adjusts the CVVD. The vehicle control system 100 controls the tuning of the overlap area 40 of the intake and exhaust valves 14 and 16 with their opening/closing duration and enhances idle or operating quality of the vehicle to impart specific performance characteristic on the powertrain including the engine 10. By utilizing the CVVD in the engine 10, the vehicle control system 100 imparts audible and vibratory perceived performance enhancements during varied operating conditions so that the enhanced performance provides increased vehicle power correlated with increased vehicle safety for customers. In addition, the vehicle control system 100 serves to impart higher performance drive characteristics on the powertrain in a temporary or permanent manner. For example, if a customer of the vehicle generally chooses a performance setting, the vehicle can be shaken, sounded and performed with characteristics that may not be desired in the same vehicle by a different customer.

Furthermore, since the vehicle control system 100 is configured to control the hardware system which has design limitations for improving the performance characteristics, the vehicle control system 100 utilizes to impart increased fuel economy traits or smooth/quiet operating characteristics. That is, the vehicle control system 100 improves NVH (noise, vibration, and harshness) related performance characteristics on the powertrain including the internal combustion engine 10.

Figure 3A:
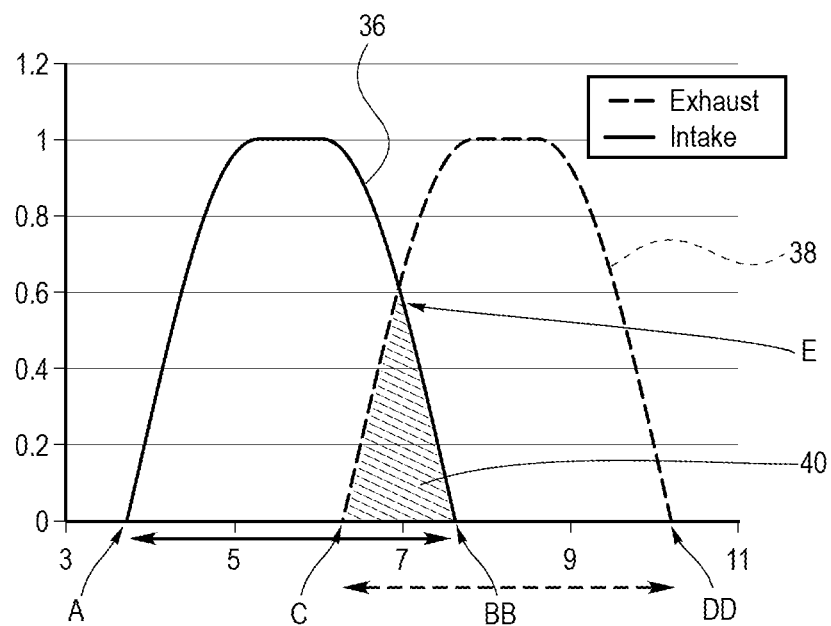
FIGS. 3A and 3B are graphs showing adjusted CVVD of the intake and exhaust valves of FIG. 1.
Figure 3B:
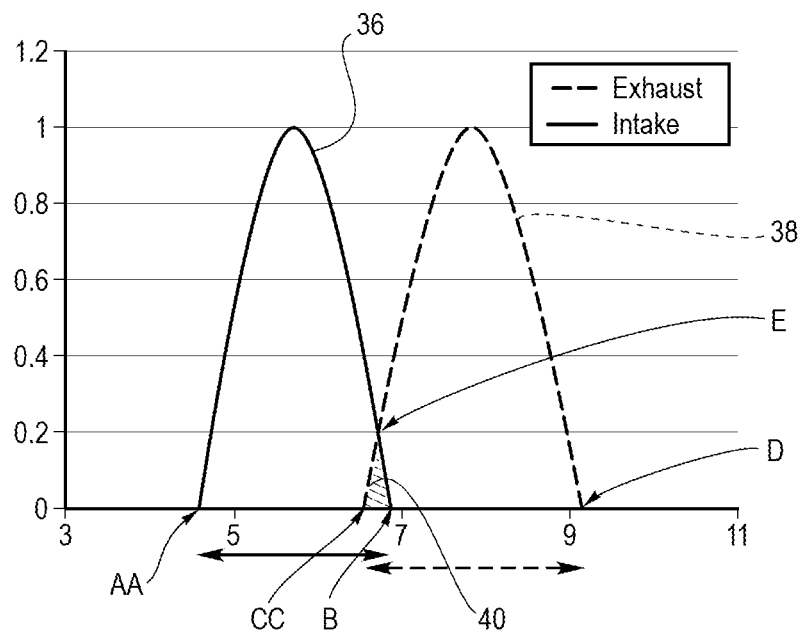

FIGS. 3A and 3B show examples of the valve profile graph with an adjusted overlap area 40 illustrating the intake and exhaust valve opening/closing duration by the operation of the intake and exhaust CVVD devices 32 and 34. In FIGS. 3A and 3B, the intake opening/closing duration curve 36 of the intake valve 14 and the exhaust opening/closing duration curve 38 of the exhaust valve 16 in the internal combustion engine 10 are also illustrated. As shown in the graph of FIG. 3A, the intake valve 14 opens at the same point A as in FIG. 2 but closes at point BB, to which the closing time of the intake valve 14 extends. The exhaust valve 16 opens at the same point C as in FIG. 2, but closes at point DD, to which the closing time of the exhaust valve 16 extends. Accordingly, the vehicle control system 100 controls the closing time of the valves so that the overlap area 40 of each of the intake and exhaust valves 14 and 16 is increased. In accordance with other forms of the present disclosure, however, the closing time of the intake and exhaust valves 14 and 16 may be shortened such that the overlap area 40 of the opening/closing duration of the intake and exhaust valves 14 and 16 may be decreased.

As shown in FIG. 3B, furthermore, the intake valve 14 opens at point AA, which is delayed when compared to the opening time in FIG. 2, but closes at the same point B as in FIG. 2. The exhaust valve 16 also opens at point CC, which is delayed when compared to the opening time in FIG. 2 but closes the same point D as in FIG. 2. Accordingly, the vehicle control system 100 controls the opening time of the valves so that the overlap area 40 of each of the intake and exhaust valves 14 and 16 decreased. In accordance with other forms of the present disclosure, however, the opening time of the intake and exhaust valves 14 and 16 may be shifted to earlier time such that the overlap area 40 of the opening/closing duration of the intake and exhaust valves 14 and 16 may be increased. Also, both opening and closing time of each of the intake and exhaust valves 14 and 16 may be controlled to adjust the overlap area 40 at the same time. Accordingly, the vehicle control system 100 controls the opening/closing duration of the valves so that the overlap area 40 of the intake and exhaust valves 14 and 16 is increased or decreased. The vehicle control system 100 increases or decreases the valve duration, which can take place at idle conditions. This allows for idle stability control, while inducing sound/vibration characteristics desired by customers. Therefore, due to the increased or decreased valve opening/closing duration (the overlap area), the NVH related performance characteristics including the idle stability in the vehicle are improved.

Figure 4:
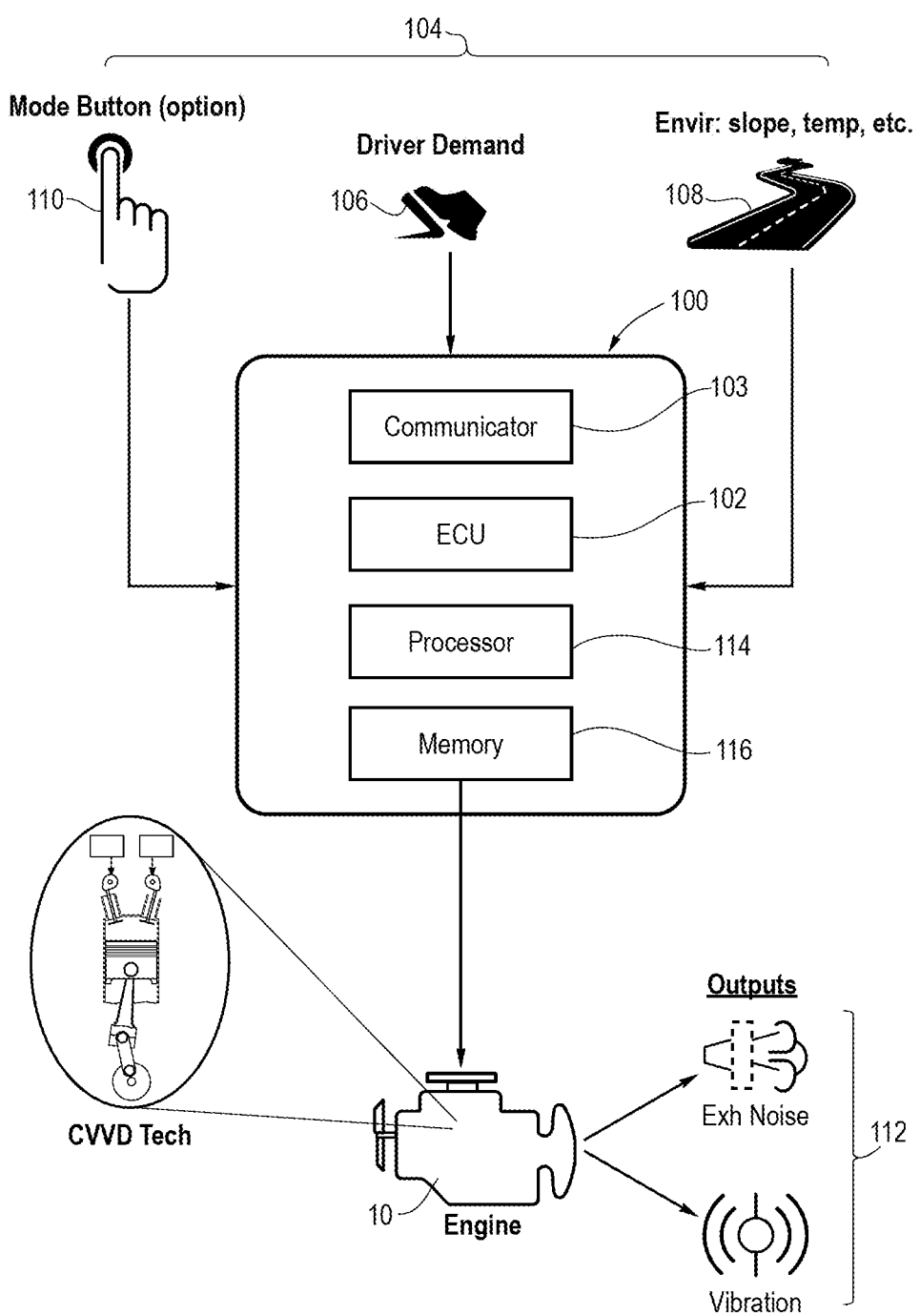
FIG. 4 is a schematic diagram illustrating a vehicle control system in accordance with a form of the present disclosure.

FIG. 4 shows a schematic view of the vehicle control system 100. As described above, the vehicle control system 100 includes the electronic control unit (ECU) 102 for referencing and evaluating the data, and a communicator 103 for receiving input data from a plurality of input systems 104. The vehicle control system further includes a processor 114 and a memory 116 for storing the data as a storage device. The vehicle control system 100 is configured to control the overlap area 40 of the continuous variable valve duration (CVVD) of the intake and exhaust valves 14 and 16 in the internal combustion engine 10. The communicator 103 of the vehicle control system 100 receives input data from at least one of the input systems 104 and the ECU 102 determines to adjust the opening/closing duration of the valves 14 and 16 based on the received input data. In addition, the vehicle control system 100 sends the determined signal to the engine 10 for adjusting the appropriate duration of the CVVD devices 32 and 34. The input systems 104 include a driver demand 106 such as an accelerator pedal position or a pedal rate and environment inputs 108 such as a road slope, a temperature, and a barometric pressure, etc. The input systems 104 further include a mode switch 110 for selecting one of the different modes such as a normal mode, an economic mode, and a sport mode in a vehicle having the mode switch 110 as an option.

As described above, the ECU 102 references a predetermined calibration tables (values) stored in the memory (the storage device) 116 based on one of the received input data and determines whether to adjust the overlap area 40 of the signal for sending to the CVVD devices 32 and 34 of the engine 10. The predetermined calibration values associate the input data to desired noise, vibration, and harshness (NVH) profiles for the powertrain including the engine 10. The vehicle control system 100 sends the determined signal from the ECU 102 to the engine 10 for controlling the opening/closing duration of the intake and exhaust valves 14 and 16. The engine 10 including the CVVD devices 32 and 34 receives the determined signal from ECU 102 and the determined signal is applied to the intake and exhaust CVVD devices 32 and 34 for appropriately changing the overlap area 40 of the intake and exhaust valves 14 and 16. For example, as shown in FIG. 3A, the opening/closing duration of the intake and exhaust valves 14 and 16 is extended by adjusting the closing time of the valves 14 and 16. In addition, as shown in FIG. 3B, the opening/closing duration of the intake and exhaust valves 14 and 16 is reduced by adjusting an opening time of the valves 14 and 16. Due to the appropriately adjusted overlap area 40 of the opening/closing duration of the intake and exhaust valves 14 and 16, outputs 112 such as noise, vibration, and harshness (NVH) emitted by the powertrain system including the engine 10 are improved such that the desired NVH profile of the powertrain is set. Therefore, the resultant outputs 112 including the NVH character are matched to a desired state of the vehicle.

Figure 5:
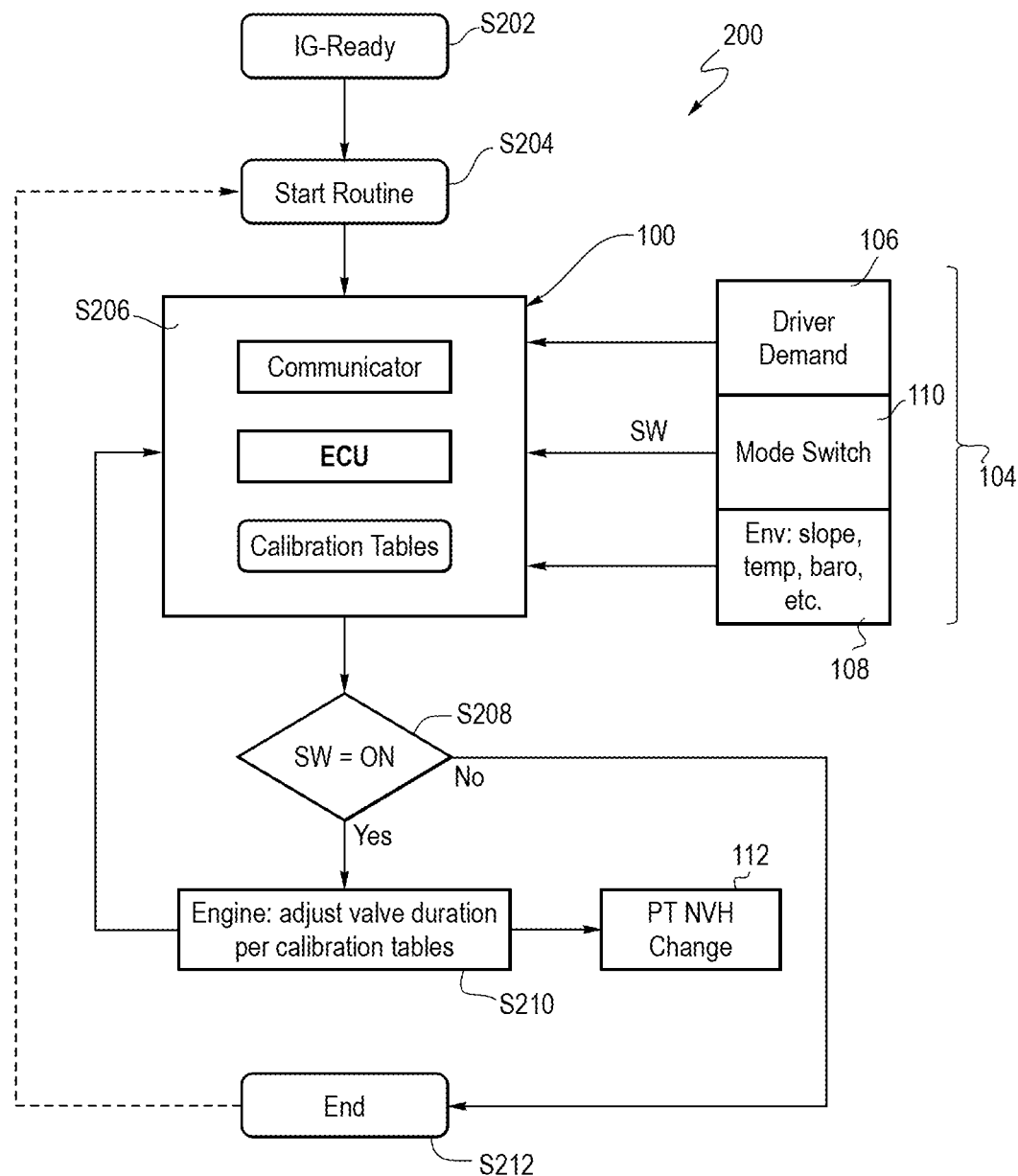
FIG. 5 is a flow chart showing an operation process of the vehicle control system in accordance with a form of the present disclosure.

FIG. 5 illustrates a block diagram (a first flow chart) 200 for an operation process of the vehicle control system 100. In step S202, the internal combustion engine 10 of the vehicle is started, and in step S204, the vehicle control system 100 for controlling the intake and exhaust CVVD devices 32 and 34 is initiated. In step S206, the communicator 103 of the vehicle control system 100 receives an input data from one of the various input systems 104 such as the driver demand 106, the environment inputs 108, or the mode switch 110. After that, the ECU 102 references the predetermined calibration tables based on the received input data to determine the CVVD request for the intake and exhaust valves 14 and 16.

In step S208, the vehicle control system 100 determines whether the operation switch of the CVVD devices 32 and 34 based on the evaluation of the ECU 102 is turned on. In step S208, if the vehicle control system 100 determines to turn on the operation switch of the CVVD devices 32 and 34 (it means that the vehicle control system 100 determines to send the signal to the engine 10 for adjusting the opening/closing duration of the valves 14 and 16), the vehicle control system 100 sends the determined signal to the engine 10 for controlling the opening/closing duration of the intake and exhaust valves 14 and 16. In step S210, the overlap area 40 of the opening/closing duration of the intake and exhaust valves 14 and 16 is adjusted. Accordingly, due to the adjusted CVVD by controlling the opening/closing duration of the intake and exhaust valves 14 and 16, the NVH (noise, vibration, and harshness) of the powertrain system is enhanced or improved by matching to the desired state.

In step S208, if the vehicle control system 100 determines not to turn on the operation switch of the CVVD devices 32 and 34 (it means that the vehicle control system 100 determines not to send the signal to the engine 10 for adjusting the opening/closing duration of the valves 14 and 16), the vehicle control system 100 ends the process of the CVVD operation in step S212. After that, the vehicle control system 100 reinitiates and continuously restarts the process of the CVVD operation in step S204.

Figure 6:
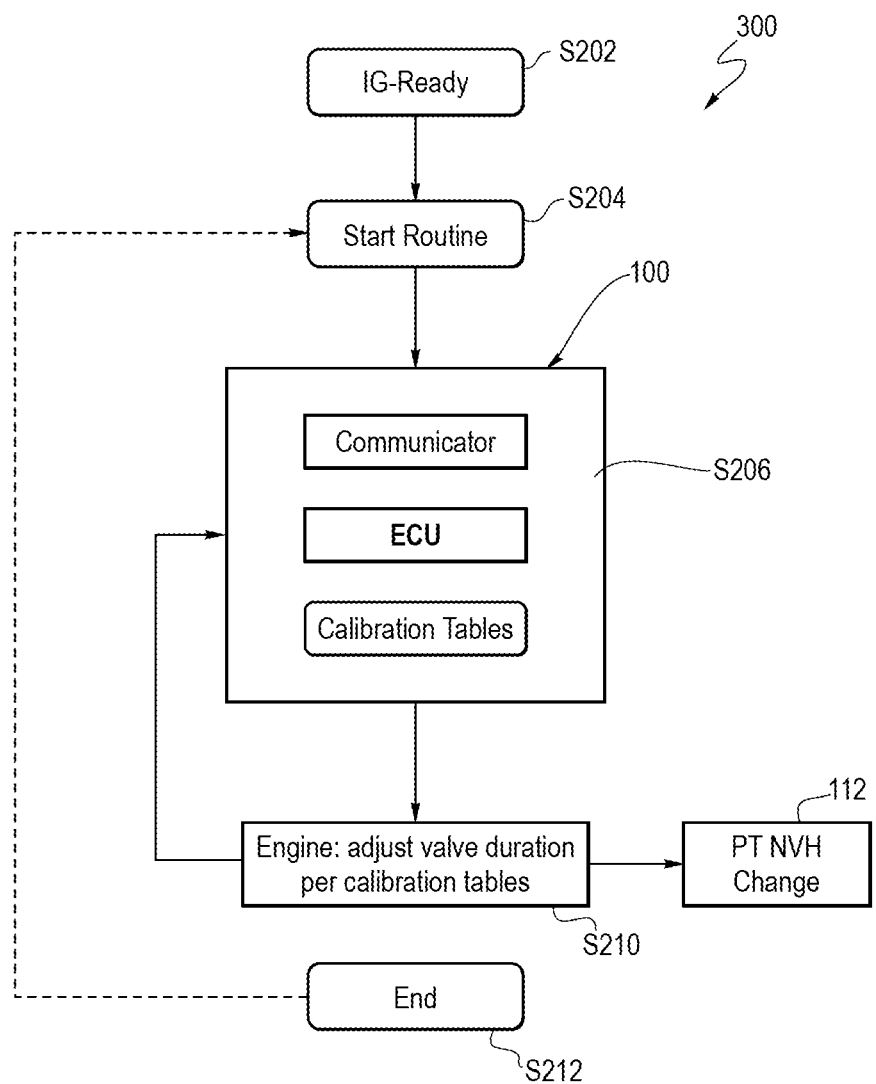
FIG. 6 is a flow chart showing another operation process of the vehicle control system in accordance with another form of the present disclosure.

In accordance with other forms of the present disclosure, FIG. 6 illustrates another block diagram (a second flow chart) 300 for a process of the vehicle control system 100. In FIG. 6, the process of the vehicle control system 100 is operated without step S208 of the operation process in the first flow chart 200 of FIG. 5. In the operation process of the second flow chart 300, the vehicle control system 100 does not need to determine to turn on the operation switch of the CVVD devices 32 and 34 based on the evaluation of the ECU 102 with the input data from the various input systems 104. The vehicle control system 100 in the operation process of the second flow chart 300 automatically and continuously adjusts the overlap area 40 of the opening/closing duration of the intake and exhaust valves 14 and 16 for enhancing the NVH performance to meet the desired state of the vehicle.

Figure 7:
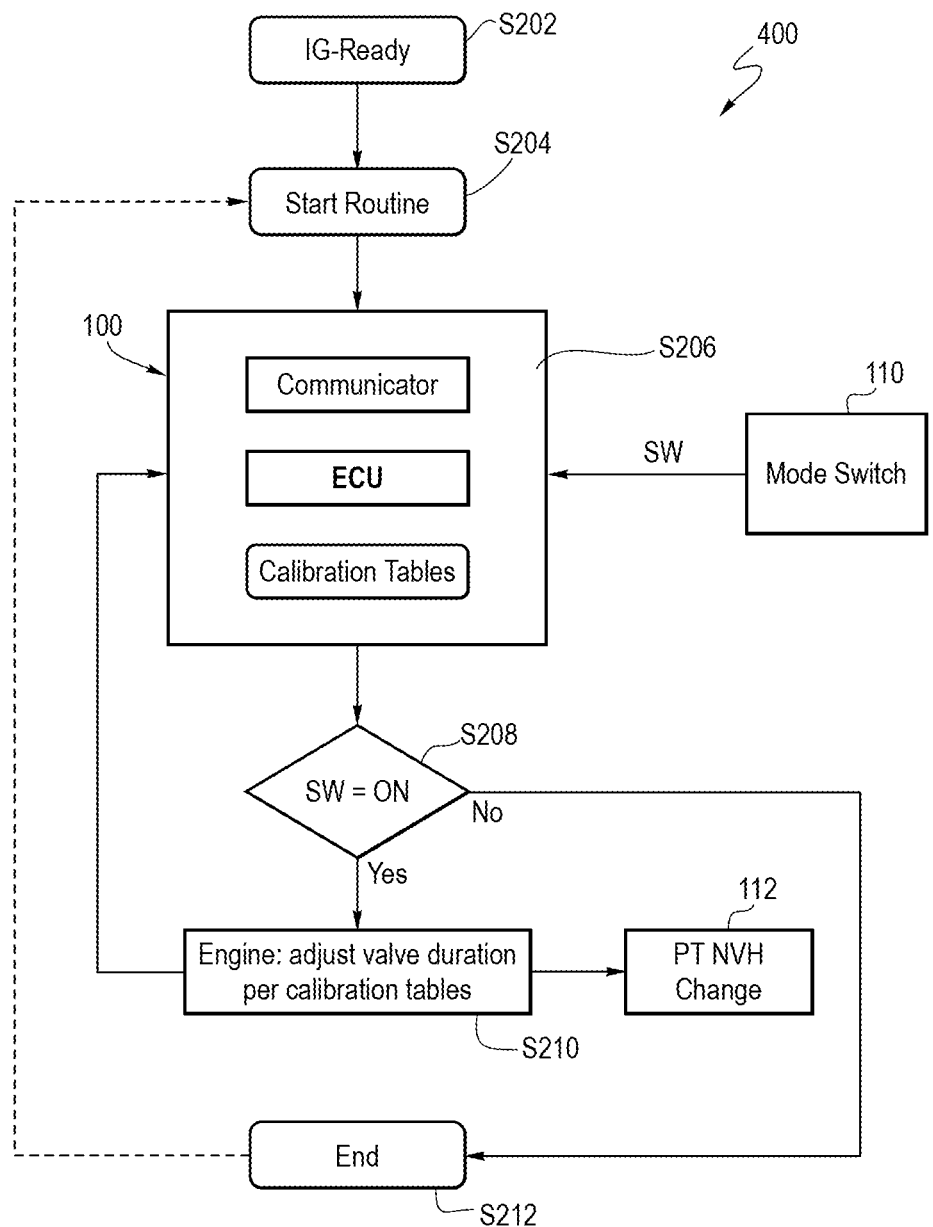
FIG. 7 is a flow chart showing another operation process of the vehicle control system in accordance with another form of the present disclosure.

In accordance with other forms of the present disclosure, FIG. 7 illustrates another block diagram (a third flow chart) 400 for an operation process of the vehicle control system 100. As shown in FIG. 7, the communicator 103 of the vehicle control system 100 receives an input data only from the mode switch 110 because the vehicle having the vehicle control system 100 relies solely on the input data of the mode switch 110. Accordingly, the operation process of the vehicle control system 100 in the third flow chart 400 of FIG. 7 depends on the input data received only from the mode switch 110 in the vehicle.

Figure 8:
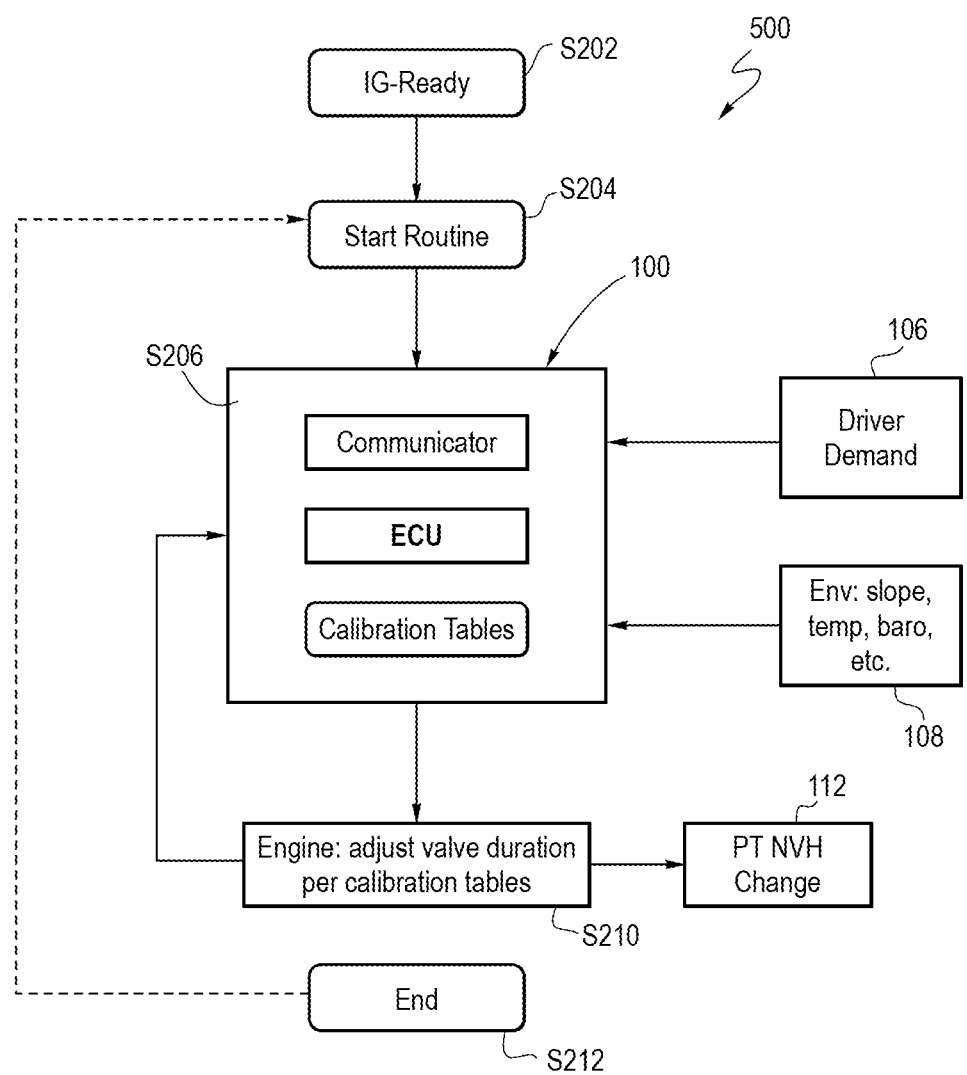
FIG. 8 is a flow chart showing another operation process of the vehicle control system in accordance with another form of the present disclosure.

In accordance with other forms of the present disclosure, FIG. 8 illustrates another block diagram (a fourth flow chart) 500 for an operation process of the vehicle control system 100. In the fourth flow chart 500, the determining step S208 of the ECU 102 to adjust the CVVD as in FIG. 5 is omitted because the operation process of the vehicle control system 100 in a vehicle such as a sport vehicle or luxury vehicle is continuously performed as a standard option for a consistent powertrain character and is desired throughout all operating conditions. Furthermore, the mode switch 110 in the vehicle such as the sport vehicle or luxury vehicle may be unnecessary for selecting one of the modes (a normal mode, an economic mode, and a sport mode) as an option. Accordingly, the vehicle control system 100 in the vehicle such as the sport vehicle or luxury vehicle may be operated as shown in the fourth flow chart 500 of FIG. 8.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A vehicle control system for a powertrain including an engine having an intake valve and an exhaust valve in a vehicle, the vehicle control system comprising:
   an intake continuously variable valve duration (CVVD) device configured to change an opening duration of an intake valve while maintaining an amount of valve lift of the intake valve at a first constant value;
   an exhaust CVVD device configured to change an opening duration of an exhaust valve while maintaining an amount of valve lift of the exhaust valve at a second constant value;
   an electronic control unit (ECU) including a processor and configured to control the intake CVVD and exhaust CVVD devices of the engine; and
   a storage device configured to store predetermined calibration values associating input data received from at least one input system to set desired noise, vibration and harshness (NVH) profiles for the powertrain,
   wherein the ECU is configured to reference the predetermined calibration values based on the received input data, determine to control the intake CVVD and exhaust CVVD devices for the intake and exhaust valves so as to change an overlap area of the intake and exhaust valves to set the desired NVH profiles of the powertrain, and
   wherein the at least one input system includes a mode switch for selecting one of different modes including a normal mode, an economic mode, and a sport mode of the vehicle, and
   wherein upon receipt of a control signal from the ECU, the intake CVVD device and the exhaust CVVD device are configured to change the overlap area of the intake and exhaust valves while maintaining the amount of valve lift of the intake and exhaust valves at the first and second constant values, respectively.

2. The vehicle control system of claim 1, wherein the ECU is configured to increase the overlap area by extending the opening duration of each of the intake and exhaust valves.

3. The vehicle control system of claim 1, wherein the ECU is configured to decrease the overlap area by reducing the opening duration of each of the intake and exhaust valves.

4. The vehicle control system of claim 1, wherein the at least one input system provides a driver demand including an accelerator pedal position or a pedal rate.

5. The vehicle control system of claim 1, wherein the at least one input system provides an environmental input including a road slope, a temperature, or a barometer pressure.

6. The vehicle control system of claim 2, wherein the increased overlap area of the intake and exhaust valves results in an enhanced NVH (noise, vibration, and harshness) of the powertrain.

7. The vehicle control system of claim 3, wherein the decreased overlap area of the intake and exhaust valves results in an enhanced NVH (noise, vibration, and harshness) of the powertrain.

8. A method for controlling a continuously variable valve duration (CVVD) of an intake valve and an exhaust valve in a powertrain including an engine of a vehicle, the method comprising the steps of:
   initiating a vehicle control system by starting the engine;
   receiving an input data from at least one input system;
   referencing predetermined calibration values based on the received input data by a processor of an electronic control unit (ECU) of the vehicle control system; and
   sending, by the ECU, a signal to an intake CVVD device and an exhaust CVVD device for changing an overlap area of the intake and exhaust valves to set desired noise, vibration, and harshness (NVH) profiles of the powertrain, wherein the at least one input system includes a mode switch for selecting one of different modes including a normal mode, an economic mode, and a sport mode of the vehicle, and wherein changing the overlap area of the intake and exhaust valves is performed by changing an opening duration of each of the intake and exhaust valves while respectively maintaining an amount of valve lift of the intake and exhaust valves at respective constant values by the intake CVVD device and the exhaust CVVD device.

9. The method of claim 8, wherein the method further includes the step of determining, by the processor of the ECU, whether to adjust the CVVD of the intake and exhaust valves.

10. The method of claim 8, wherein the step of sending the signal to the intake CVVD device and the exhaust CVVD device includes the step of increasing the overlap area by extending the opening duration of each of the intake and exhaust valves.

11. The method of claim 8, wherein the step of sending the signal to the intake CVVD device and the exhaust the CVVD includes the step of decreasing the overlap area by reducing the opening duration of each of the intake and exhaust valves.

12. The method of claim 10, wherein the increased overlap area of the intake and exhaust valves results in an enhanced NVH (noise, vibration, and harshness) of the powertrain.

13. The method of claim 11, wherein the decreased overlap area of the intake and exhaust valves results in an enhanced NVH (noise, vibration, and harshness) of the powertrain.

14. The method of claim 8, wherein the at least one input system provides a driver demand including an accelerator pedal position or a pedal rate.

15. The method of claim 8, wherein the at least one input system provides an environmental input including a road slope, a temperature, or a barometer pressure.

16. The method of claim 8, wherein the predetermined calibration values associate the input data to the desired NVH profiles for the powertrain.

\* \* \* \* \*